(12) United States Patent
Federici

(10) Patent No.: US 7,915,587 B2
(45) Date of Patent: Mar. 29, 2011

(54) METHODS OF RAPID PHASE MODULATION OF THZ RADIATION FOR HIGH SPEED THZ IMAGING, SPECTROSCOPY, AND COMMUNICATIONS DEVICES AND SYSTEMS

(75) Inventor: John Francis Federici, Westfield, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 12/435,148

(22) Filed: May 4, 2009

(65) Prior Publication Data
US 2010/0001189 A1    Jan. 7, 2010

Related U.S. Application Data

(63) Continuation-in-part of application No. 12/426,515, filed on Apr. 20, 2009.

(60) Provisional application No. 61/051,887, filed on May 9, 2008, provisional application No. 61/046,126, filed on Apr. 18, 2008, provisional application No. 61/046,132, filed on Apr. 18, 2008.

(51) Int. Cl.
*G21K 1/00* (2006.01)
(52) U.S. Cl. .................................................. 250/341.1
(58) Field of Classification Search ................ 250/341.1
See application file for complete search history.

(56) References Cited

U.S. PATENT DOCUMENTS

| | | | |
|---|---|---|---|
| 6,348,683 B1 | 2/2002 | Verghese et al. | |
| 6,414,473 B1 | 7/2002 | Zhang et al. | |
| 6,563,622 B2 | 5/2003 | Mueller et al. | |
| 6,640,034 B1 | 10/2003 | Charlton et al. | |
| 6,665,321 B1 * | 12/2003 | Sochava et al. | 372/20 |
| 6,723,991 B1 * | 4/2004 | Sucha et al. | 250/341.1 |
| 6,909,095 B2 | 6/2005 | Tran et al. | |
| 7,078,697 B2 | 7/2006 | Barker et al. | |
| 7,291,839 B1 * | 11/2007 | Demers et al. | 250/341.1 |
| 2009/0283680 A1 * | 11/2009 | Logan et al. | 250/339.07 |

OTHER PUBLICATIONS

International Search Report and Written Opinion for corresponding PCT application PCT/US2009/041110, Sep. 15, 2009. (Form PCT/ISA/220/210/237).

Karsten J. Siebert, et. al., "Continuous-wave all-optoelectronic terahertz imaging" Applied Physics Letters, vol. 80 No. 16, pp. 3003-3005, Apr. 22, 2002.

Nicholas Karpowicz, et. al., "Comparison between pulsed terahertz time-domain imaging and continuous wave terahertz imaging" Semicond. Sci. Technol. 20 (2005) S293-S299.

I. S. Gregory, et. al., "Continuous-wave terahertz with a 60 dB dynamic range" Applied Physics Letters 86, 204104, (2005), 204104-1-3.

Aparajita Bandyopadhyay, et. al., "Terahertz interferometric and synthetic aperture imaging" J. Opt. Soc. vol. 23, No. 5, May 5, 2006, 1168-1178.

(Continued)

*Primary Examiner* — Constantine Hannaher
(74) *Attorney, Agent, or Firm* — Timothy X. Gibson, Esq.; Gibson & Dernier LLP

(57) ABSTRACT

Rapid, voltage controlled phase modulation of continuous wave THz radiation is demonstrated. By transmitting an infrared laser beam through a phase modulator, the phase of the THz radiation which is generated by the photomixing of two infrared beams can be directly modulated through a $2\pi$ phase shift. The 100 kHz modulation rate that is demonstrated is approximately three orders of magnitude faster than what can be achieved by mechanical scanning.

24 Claims, 4 Drawing Sheets

OTHER PUBLICATIONS

Ajay Nahata, et.al., "Two-dimensional imaging of continuous-wave terahertz radiation using electro-optic detection", Applied Physics Letters vol. 81, No. 6, Aug. 5, 2002, 963-965.

Lothar Möller, et. al., "Data encoding on terahertz signals for communication and sensing" Optics Letters vol. 33, No. 4, Feb. 15, 2008, 393-395.

Jingzhou Xu, et. al., "Circular involute stage" Optics Letters, Sep. 1, 2004, vol. 29, No. 17, 2082-2084.

Kyoji Shibuya, et. al., "Compact and inexpensive continuous-wave subterahertz imaging system with a fiber-coupled multimode laser diode" Applied Physics Letters 90, 161127 (2007), 161127-1-161127-3.

Ja-Yu Lu, et. al., "Optoelectronic-Based High-Efficiency Quasi-CW Terahertz Imaging" IEEE Photonics Technology Letters vol. 17, No. 11, Nov. 2005, 2406-2408.

Kleine-Ostmann, et. al., "Continuous-wave THz imaging" Electronics Letters vol. 37, No. 24, Nov. 22, 2001, 1461-1463.

Ajay Nahata, et. al., "Free-space electro-optic detection of continuous-wave terahertz radiation" Applied Physics letters vol. 75, No. 17, Oct. 25, 1999, 2524-2526.

John F. Federici, er. al., "THz imaging and sensing for security applications-explosives, weapons and drugs" Semicond. Sci. Technol. 20 (2005) S266-S280.

Torsten Loffler, et. al., "Continous-wave terahertz imaging with a hybrid system" Applied Physics Letters 90, 091111 (2007), 091111-1-091111-3.

Andrey I. Meshkov, et al., "Broadband absolute absorption measurements of atmospheric continua with millimeter wave cavity ringdown spectroscopy" Review of Scientific Instruments 76, 083103 (2005), 083103-1-083103-9.

Wai Lam Chan, et. al., "Imaging with terahertz radiation" Rep. Prog. Phys. 70, (2007), 1325-1379.

Frank C. De Lucia, "Spectroscopy in the Terahertz Spectral Region" Sensing with Terahertz Radiation, Mittleman (Ed.) (2003) 39-49.

\* cited by examiner

METHODS OF RAPID PHASE MODULATION OF THZ RADIATION FOR HIGH SPEED THZ IMAGING, SPECTROSCOPY, AND COMMUNICATIONS DEVICES AND SYSTEMS

CROSS-REFERENCE TO RELATED APPLICATIONS

This application claims the benefit of U.S. Provisional Patent Application No. 61/051,887, filed May 9, 2008, and is a continuation-in-part of U.S. patent application Ser. No. 12/426,515, filed Apr. 20, 2009, which claims the benefit of U.S. Provisional Application Nos. 61/046,126, filed Apr. 18, 2008, 61/046,132, filed Apr. 18, 2008 and 61/051,887, filed May 9, 2008, the entireties of which are incorporated herein by reference.

GOVERNMENT RIGHTS

The research leading to the present invention was supported, in part by the Department of Defense's Technical Service Work Group (TSWG) through a contract (N41756-04C-4163) and by the U.S. Army through a contract (DAAE3003D1015-18). Accordingly, the United States Government may have certain rights in the invention.

FIELD OF THE INVENTION

This invention relates to methods of rapid phase modulation of terahertz (THz) radiation and devices and systems employing same for high-speed THz imaging, spectroscopy and wireless communications.

BACKGROUND OF THE INVENTION

There has been a rapid expansion in the area of terahertz technology, apparatus and components using THz technology. The feasibility of various THz applications has been greatly expanded due to the development of spectroscopy and imaging methods such as THz time-domain spectroscopy (THz TDS) and continuous wave (CW) THz imaging. One of the limitations in applying THz TDS to imaging has been the requirement for a scanning method that records the entire THz time-domain waveform. Most time-domain THz systems use slow mechanical scanning delay lines, or mirror shakers (15-300 Hz repetition rate)(Chan et al., "Imaging with terahertz radiation", Rep. Prog. Phys. 70, 1325-1379 (2007)) to detect the THz waveform on a point by point basis. Improvements to the mechanical scanning method have included piezo-electric delay lines, which are reasonably fast (kHz) but are limited to a 10 ps scanning range, as well as a rotating scanning stage. J. Xu and X.-C. Zhang, "Circular involute stage", Opt. Lett. 29 2082 (2004).

For the CW photomixing configuration, two laser sources are typically multiplied or mixed in a device such as a photoconductive antenna structure. THz radiation is generated at the difference frequency of the two laser sources. Some groups have used Golay cells, bolometers (J.-Y. Lu et al., "Optoelectronic-based high-efficiency quasi-CW terahertz imaging", IEEE Photon. Tech. Letters 17, 2406 (2005)), or other power detection devices. Since the THz power, not electric field, is detected in these devices, the THz phase information is lost. However, no scanning of the THz waveform is required. For the coherent detection approach, the THz waveform is scanned by varying the phase (or arrival) of the THz waveform relative to the phase of the mixed laser beams. Following the example of THz TDS, a mechanically scanning delay rail (A. Nahata et al., "Free-space electro-optic detection of continuous-wave terahertz radiation", Appl. Phys. Lett. 75, 2524 (1999); K. J. Siebert et al., "Continuous-wave all-optoelectronic terahertz imaging", Appl. Phys. Lett. 80, 3003 (2002); N. Karpowicz et al., "Comparison between pulsed terahertz time-domain imaging and continuous wave terahertz imaging", Semicond. Sci. Technol. 20, 293 (2005)) typically is used to vary the optical path of the two infrared laser beams after the beams have been combined. These delay rails are typically slow, not because a long waveform is recorded as is the case of the THz TDS systems, but rather because the delay induced by the scanning rail must be comparable in distance to the wavelength of the THz radiation (~300 μm for 1THz).

Consequently there is the need for faster THz methods and devices and systems employing same.

SUMMARY OF THE INVENTION

The present inventors have found that faster THz methods and devices can be achieved in accordance with various aspects of the present invention.

In accordance with one aspect of the present invention, the inventors have found that the rate of scanning can increased because the initial phase of the THz wave in the photomixing process is determined by the phase difference of the two lasers. In accordance with one embodiment of the present invention, a system is provided in which one of the infrared lasers is directly modulated using a Lithium Niobate phase modulator. Since the speed of Lithium Niobate modulators can be as high as the gigahertz range, the speed limitations due to mechanical scanning in acquiring a THz waveform in prior art methods and systems are essentially eliminated.

The present invention provides methods of rapid phase modulation of terahertz (THz) radiation for high-speed THz imaging, spectroscopy and communications. Terahertz (THz) radiation has shown potential in a wide variety of applications including detection of concealed weapons and explosives (J. F. Federici et al., "Detection of Explosives by Terahertz Imaging", in *Counter-Terrorism Detection Techniques of Explosives* Jehuda Yinon Ed. (Elsevier 2007); T. Löffler, et al., "Continuous-wave terahertz imaging with a hybrid system", Appl. Phys. Lett. 90, 091111 (2007)); chemical detection and spectroscopy (A. I. Meshkov and F. C. DeLucia, "Broadband absolute absorption measurements of atmospheric continua with millimeter wave cavity ringdown spectroscopy", Rev. Sci. Instrum. 76, 083103 (2005)); and imaging (W. L. Chan et al., "Imaging with terahertz radiation", Rep. Prog. Phys. 70, 1325-1379 (2007)). The disclosed methods can be employed in a wide variety of devices and systems including but not limited to stand-off detection of explosives, biological and chemical weapons; concealed weapon detection, drug detection, hand-held scanners, imaging and non-destructive testing and wireless communications.

BRIEF DESCRIPTION OF THE DRAWINGS

To assist those of ordinary skill in the relevant art in making and using the subject matter hereof, reference is made to the appended drawings, wherein:

In FIG. 2(a) the applied voltage is 20V and 160V (middle and bottom waveform, respectively). The sawtooth waveform (top) illustrates the timing of the modulator voltage. Waveforms are vertically offset for clarity. FIG. 2(b) depicts THz detector output for a thin card inserted (solid line) between the THz transmitter and receiver of FIG. 1 and removed (dashed curve)

Figure 1:
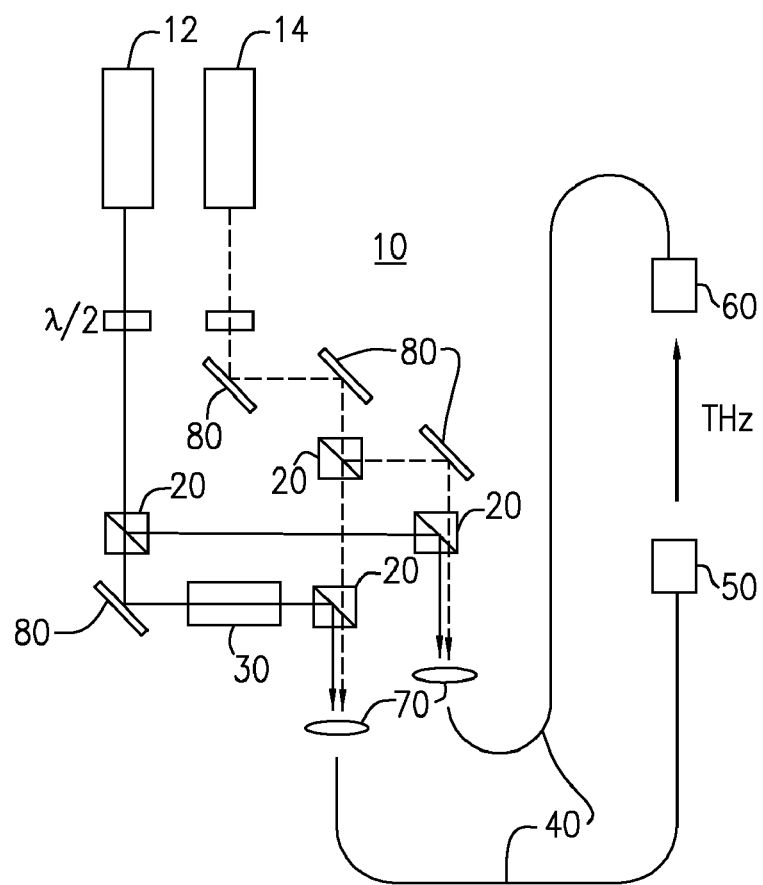
FIG. 1 is a schematic diagram of a fast phase modulation configuration in accordance with at least one embodiment of the present invention. The half waveplates are used to rotate the polarization of the laser beams parallel to the polarization axis of the optical fibers.

It should be noted that the appended drawings illustrate only typical embodiments of this invention and are therefore not to be construed as limiting of its scope, for the invention may admit to other equally effective embodiments. Where possible, identical reference numerals have been inserted in the figures to denote identical elements.

DETAILED DESCRIPTION OF THE INVENTION

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" in various places in the specification are not necessarily all referring to the same embodiment.

Now referring to FIG. 1 in one embodiment a schematic of a rapid continuous wave CW detection apparatus for detecting THz phase and amplitude is shown. The apparatus 10 includes lasers 12 and 14, beam splitters 20, a phase modulator 30, optical fibers 40, transmitter 50, receiver 60, lenses 70 and mirrors 80.

Lasers 12 and 14 may be external cavity diode lasers such as are commercially available from Sacher Lasertechnik of Marburg Germany. Phase modulator 30 is preferably a Lithium Niobate phase modulator, commercially available for example from New Focus Corp. of San Jose, Calif. Suitable examples include the New Focus models 4002, 4441 or the like.

Figure 1A:
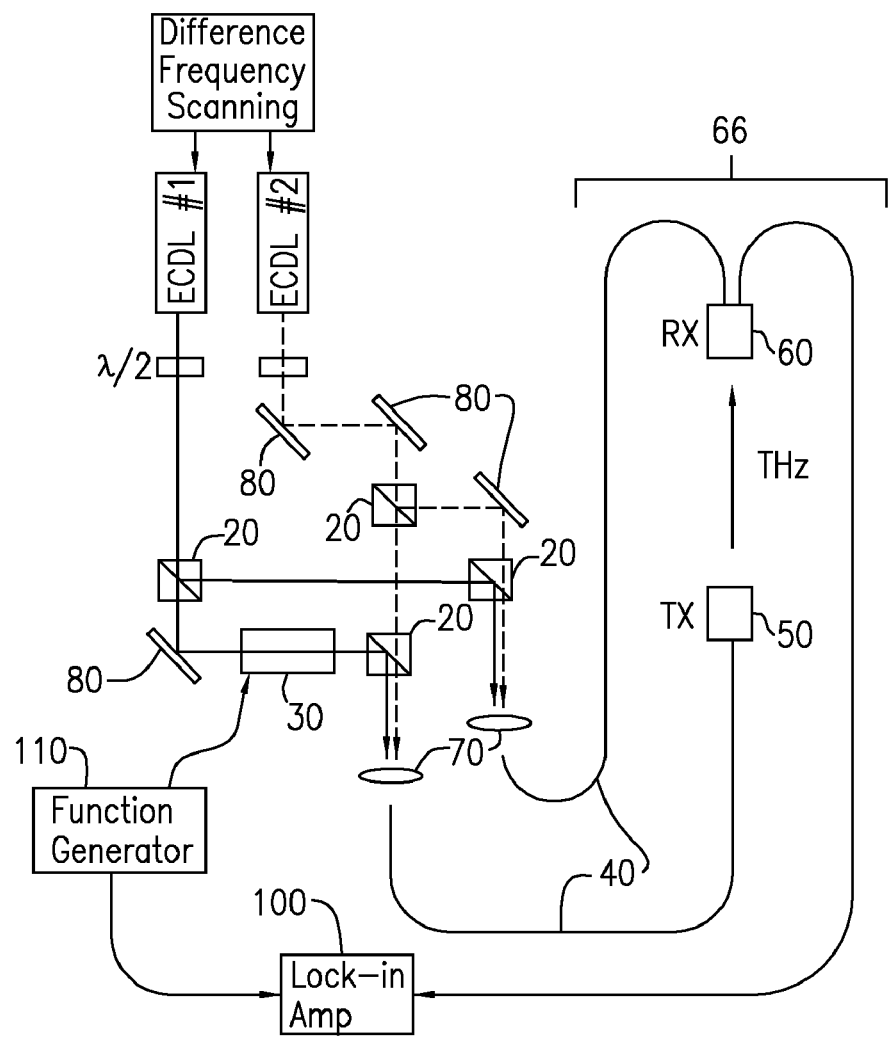
FIG. 1A is a schematic diagram of a fast phase modulation configuration employing difference frequency scanning in accordance with at least one embodiment of the present invention.

In one embodiment THz radiation is generated at the beating frequency of two Littman external cavity diode lasers 12 and 14 (Sacher Lion TEC520) operating near 0.78 μm. For purposes of the disclosed examples, the lasers 12 and 14 are detuned by 0.6 nm which corresponds to 0.3 THz. The output of each laser 12 and 14 is evenly split using a first pair of beam splitters 20. A phase modulator 30, for example a MgO:LiNbO$_3$ modulator such as a New Focus 4002, is inserted into the path of a beam from laser 12. After splitting and passing one beam through the modulator 30, the light from the lasers 12 and 14 are combined with another pair of beam splitters 20. The combined laser light is coupled into polarization-maintaining optical fibers 40 and delivered to both the THz transmitter 50 and receiver 60. Now referring to FIG. 1A, the transmitter 50 and receiver 60 in the present example may be Low-Temperature-Grown GaAs bowtie-type photo-conductive dipole antennae (PDA) 66. The total optical power on both channels is ~12 mW. A bias of 20 V DC is applied to power the THz transmitter 50. For the portion of the system 10 that operates in free space (~47 cm), beam walk of the lasers 12 and 14 does not appear to play a major role. As the wavelength of either laser 12 or 14 is piezo-tuned, <3% fluctuation in the polarized optical power that emerges from the optical fibers 40 is observed.

THz radiation is generated by photomixing of the laser beams in the THz transmitter 50. The generated THz wave can be presented as a product of electric fields, $E_{THz} \sim E_1 \Box E_2 \sim E_1 E_2 [\cos(\Delta\omega t + \Delta\phi_o)]$ where $\Delta\omega = \omega_1 - \omega_2$, $\Delta\omega_o = \phi_1 - \phi_2$, $E_1$ and $E_2$ are the amplitudes of infrared EDCL electric fields at the frequencies $\omega_1$ and $\omega_2$, and phases $\phi_1$ and $\phi_2$, respectively. The electro-optic phase modulator 30, which is inserted into the optical path of the beam of laser 12 that will drive the THz transmitter 50, is oriented so that the applied voltage induces a change in refractive index along the polarization axis of the infrared laser beam. By varying the applied voltage to the phase modulator 30, the optical path length experienced by the propagating laser beam varies proportionally. Adding the additional phase shift $\phi_m(t)$ induced by the modulator 30 gives $E_{THz}(t) \sim E_1 E_2 [\cos(\Delta\omega t + \Delta\phi_o + \phi_m(t))]$ where the time-dependent phase shift can be expressed as $\phi_m(t) = C_o V(t)$ in which $C_o$ is a constant and $V(t)$ is the applied voltage. Since the phase shift is proportional to the applied voltage, a linear phase shift requires a linear increase in voltage. After passing through free space to the THz receiver 60, the THz beam acquires a phase shift $\phi_p$. The detected THz signal is determined by mixing (multiplying) the incoming THz radiation with the two infrared laser signals present at the THz receiver 60:

$$E_{det}(t) \sim E_1^2 E_2^2 \cos(\phi_m(t) + \phi_p).$$

Figure 2:
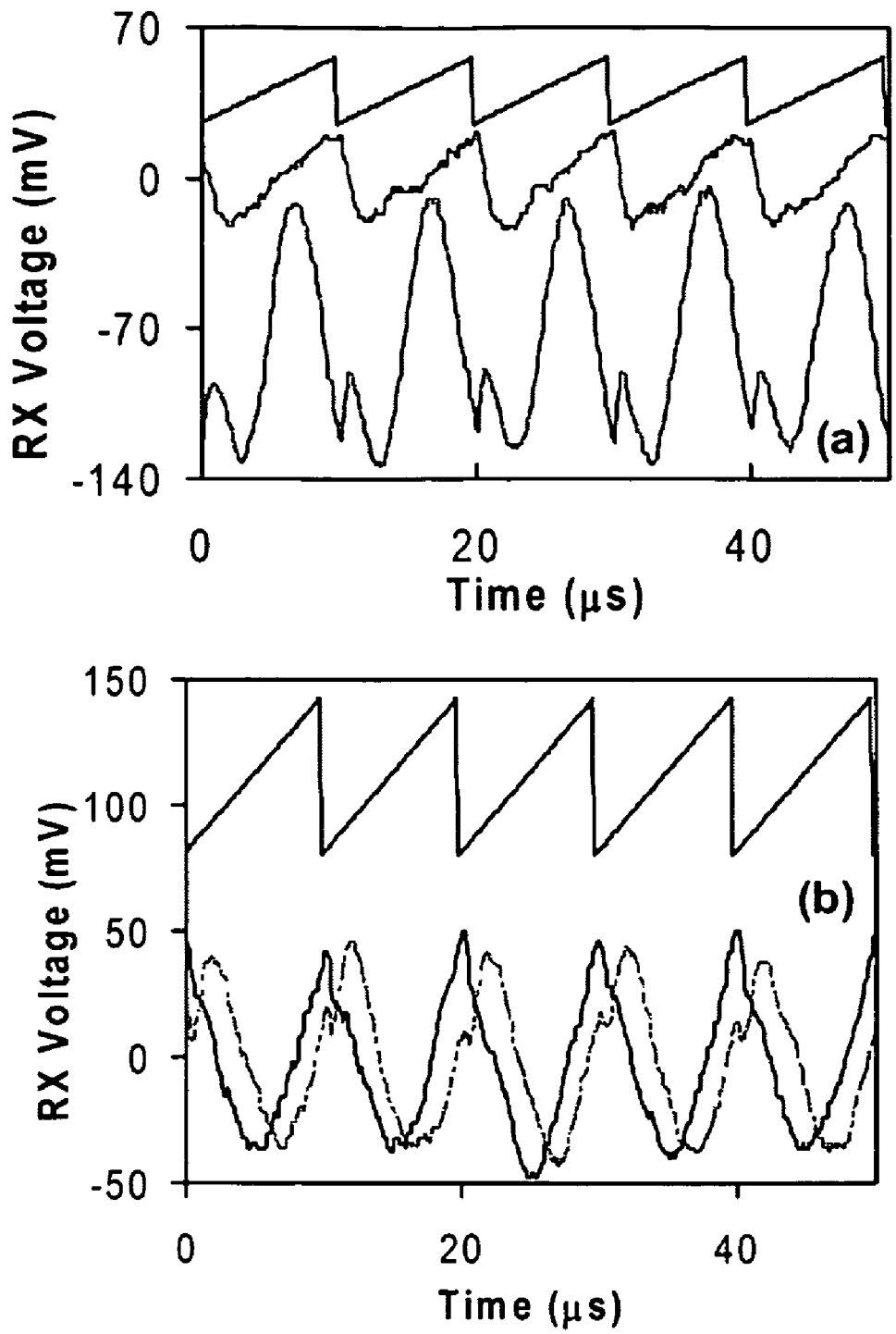
FIGS. 2(a) and 2(b) are graphical representations of THz detector voltage output versus time as a function of applied voltage to the modulator in accordance with at least one embodiment of the present invention.

The output of the THz receiver 60 can be recorded with a digital lock-in amplifier 100 that locks to the ramp modulation frequency. However, if the voltage swing corresponds to a phase shift that were either smaller than or larger than 2π, the output voltage from the THz receiver 60 would not be perfectly sinusoidal. The preference for a complete 2π phase shift in the modulator 30 is illustrated in FIGS. 2(a) and 2(b). Referring to FIG. 2(a), for voltages below the equivalent of 2π phase shift, the output waveforms are not complete sinusoids. Now referring to FIG. 2(b), for voltages that are too large, a waveform swing larger than one cycle is observed. The infrared wavelength of laser 12 in FIG. 1 is kept fixed while the wavelength of laser 14 is tuned to vary the THz wavelength. In the present example, the required voltage for a 2π phase shift should remain fixed.

When an object is inserted between the THz transmitter 50 and receiver 60 which modifies the phase shift of the propagating THz beam $\phi_p$, the measured phase of the receiver 60 waveform shifts as well. Now referring to FIG. 1, to illustrate this effect, a thin business card was inserted between the THz transmitter 50 and receiver 60. When the phase modulator 30 voltage is set correctly, the phase of the THz receiver 60 waveform shifts by 1.6 μs corresponding to a 0.32π phase shift of the THz wave. Neglecting any birefringence, the measured phase shift for the 0.34 mm thick card corresponds to a 1.47 index of refraction. The kinks in the waveforms at 0, 10, 20, 30, and 40 ps correspond to the ramp voltage resetting from a 2π to 0π phase shift. With the card present the kink occurs almost at the peak of the waveform, while the kink occurs about half-way up the waveform when the card is removed.

Figure 3:
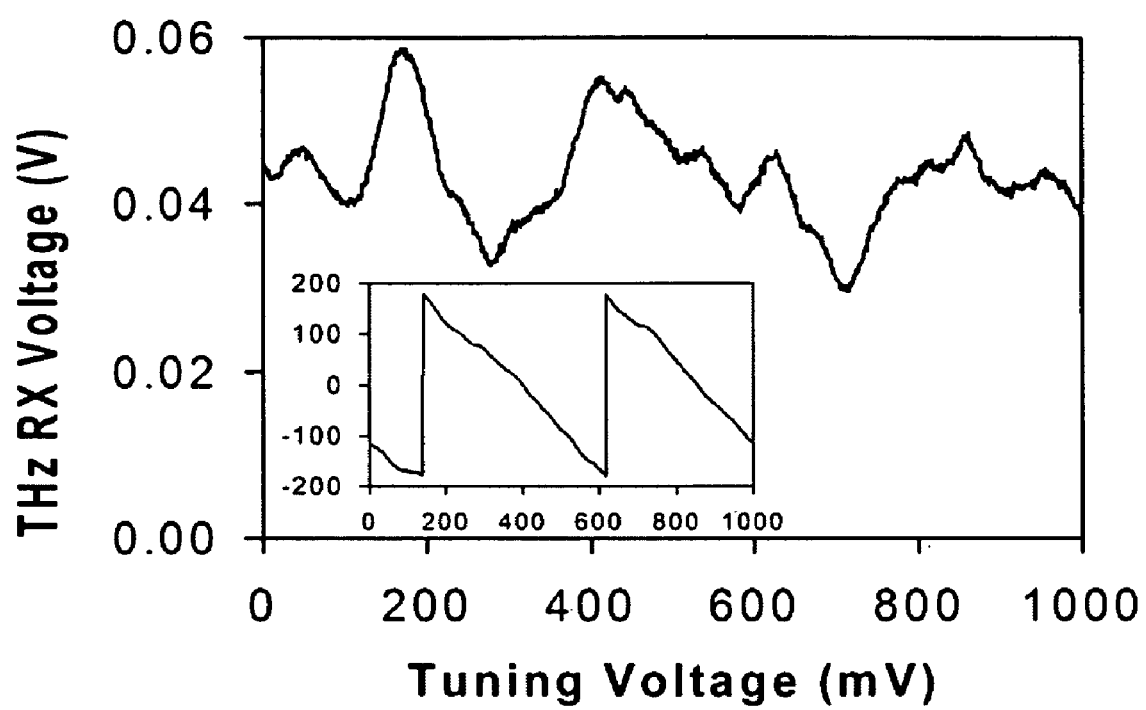
FIG. 3 is a graphical representation of rapid frequency tuning curves for the measured THz amplitude and phase in degrees (inset) over ~3 GHz in accordance with at least one embodiment of the present invention.

To demonstrate the utility of the method for fast spectral scanning, the piezo tuning capabilities on laser 14 are used to sweep the THz frequency. FIG. 3 illustrates the measured THz amplitude and phase as measured with a digital lock-in amplifier using a time constant of 640 μs. In this example, for this measurement the total tuning range of 1 V corresponds to a tuning of the THz frequency by ~3 GHz. Over this range of tuning the laser 14 does not exhibit any mode hops. The THz is scanned at 3 MHz per data point, which roughly corresponds to the spectral width of the laser. The acquisition time for the 1000 data point scan of FIG. 3 is completed in only a few seconds.

In FIG. 3 the inset shows the measured change in phase during tuning. Ideally, referring to FIG. 1, if the optical path lengths for the beam from laser 14 through the optical components and fiber-optical cables 40 to the transmitter 50 and receiver 60 were identical, there would be no observed change in phase with frequency. Based on the measured $2\pi$ phase shift over 1.43 GHz, a path difference of roughly 21 cm is estimated. This distance roughly corresponds to the expected optical path length delay due to mismatched optical fiber lengths in the apparatus 10 of this embodiment.

In regard to CW THz systems with mechanical scanning of the THz waveform, the 100 kHz repetition rate is roughly three orders of magnitude faster. The maximum scanning speed of the system 10 in this embodiment is limited due to the electronic bandwidth (roughly 420 kHz) of the THz receiver 60. In a classic THz imaging configuration in which the object's position is scanned between a single THz transmitter and receiver, the rapid scanning system operating at 100 kHz enables an averaging of 100 oscillations of the THz waveform with roughly 1000 pixels imaged per second. In another embodiment, using synthetic aperture imaging methods as disclosed in A. Bandyopadhyay, A. Stepanov, B. Schulkin, M. D. Federici, A. Sengupta, D. Gary, J. F. Federici, R. Barat, Z.-H. Michalopoulou and D. Zimdars, "Terahertz interferometric and synthetic aperture imaging", J. Opt. Soc. Am. A 23, 1168 (2006), video-rate imaging may be attained.

In applying THz spectroscopy to the gas phase chemical detection, it has been recognized that the spectral width of the absorption lines of low pressure gases is about 1 MHz in the THz range. THz spectroscopy instrumentation for gas analysis includes a fast scanning cavity ringdown approach, as disclosed in A. I. Meshkov and F. C. De Lucia, "Broadband absolute absorption measurements of atmospheric continua with millimeter wave cavity ringdown spectroscopy", Rev. Sci. Instrum. 76, 083103 (2005), that enables the measurement of 6000 different THz frequencies at a rate of ~2000 data points per second. The data shown in FIG. 3 were acquired at a rate of ~1000 data points per second with a time constant of ~640 μs per data point. The specification of the laser for the maximum rate of piezo-actuated frequency tuning is 12 kHz. Consequently, the rapid phase modulation system of the present invention may enable a data rate of ~12 k data points per second with a time constant of ~0.08 ms.

Using THz time-domain systems, the maximum measured data rate for THz wireless communication has been reported to be 1Mbit/s. Möller, L.; Federici, J.; Sinyukov, A; Xie, C.; Lim, H.; Giles, R., "Data encoding on terahertz signals for communication and sensing", Optics Letters, 33:4, 393-395 (2008). Data is encoded on the THz pulse train by modulating the bias voltage applied to the THz transmitter. There are two limitations to this data rate: the first limitation is the electronic bandwidth (420 kHz) of the THz receivers, the second is the repetition rate (~80 MHz) of the Ti:Sapphire laser that is used to generate and detect the THz. Using the present methods, increasing the bandwidth of the THz receivers beyond 80 MHz, the data rate of the fast phase modulation system exceeds that of a time-domain system.

As noted the opto-electronic methods disclosed herein are roughly 3 orders of magnitude faster than mechanical scanning methods. Utilizing the rapid phase modulation method enables MHz data rates for THz communication and can be applied for phase modulation in accordance with the present invention. In one embodiment phase modulation can be achieved using a Lithium Niobate phase modulator which can operate in the GHz range. The phase of the THz radiation can be directly modulated through a $2\pi$ phase shift. By varying the applied voltage to the modulator 50, the optical path length experienced by the propagating laser beam varies proportionally. The speed of a Lithium Niobate phase modulator can be optimized in a communications system with a function generator 110 in the hundreds of MHz range and a THz receiver having a large bandwidth response, preferably greater than 420 kHz and more preferably 80 MHz or greater.

The present inventions can be employed as wireless communication devices, and applied in any environment where deployment of same would be necessary or desirable, including but not limited to airports, military installations, mobile military units, vehicles and the like.

Applicants have attempted to disclose all embodiments and applications of the described subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All references cited herein are incorporated fully by reference.

What is claimed is:

1. A rapid phase THz modulation device comprising at least one beam splitter configured to split a laser beam into plural beams, a phase modulator oriented in the path of at least one of the plural beams, at least one beam splitter configured to combine at least some of the plural beams, and at least one optical transmission device configured to transmit the combined beams to a THz transmitter and THz receiver, wherein the phase modulator is oriented in the optical path of a laser beam that drives the THz transmitter, and wherein THz radiation is generated by photomixing of the laser beams in the THz transmitter.

2. The invention of claim 1 further comprising at least one laser beam generator.

3. The invention of claim 1 wherein the THz transmitter is configured to transmit a THz signal to the THz receiver.

4. The invention of claim 1 wherein the phase modulator is a LiNbO$_3$ modulator.

5. The invention of claim 4 comprising a communications device comprising a function generator in the hundreds of MHz range and a THz receiver having a bandwidth response greater than 420 kHz.

6. The invention of claim 1 wherein the at least one optical transmission device comprises optical fiber.

7. The invention of claim 1 wherein the THz transmitter and THz receiver comprise a Low-Temperature-Grown GaAs bowtie photo-conductive dipole antennae.

8. The invention of claim 1 wherein the phase modulator is oriented so that applied voltage induces a change in refractive index along the polarization axis of the laser beam.

9. The invention of claim 1 wherein by varying applied voltage to the phase modulator an optical path length experienced by the propagating laser beam varies proportionally.

10. The invention of claim 1 wherein after passing through free space to the THz receiver the THz beam acquires a phase shift $\phi_p$.

11. The invention of claim 10 wherein the phase shift is $2\pi$.

12. The invention of claim 1 wherein a detected THz signal is determined by mixing incoming THz radiation with two infrared laser signals present at the THz receiver.

13. The invention of claim 1 further comprising a digital lock-in amplifier for recording output of the THz receiver, wherein the amplifier may lock to a ramp modulation frequency.

14. The invention of claim 1 further comprising two external cavity diode lasers.

15. The invention of claim 1 comprising a scanning device.

16. A method of rapid phase THz modulation comprising splitting at least one laser beam into plural beams, modulating the phase of one of the plural beams that will be delivered to a THz transmitter, combining at least some of the plural beams, transmitting the combined beams including the phase modulated beam to a THz transmitter and transmitting unmodulated beams to a THz receiver, and generating THz radiation in the THz transmitter.

17. The method of claim 16 further comprising generating at least one laser beam.

18. The method of claim 16 comprising generating THz radiation by photomixing laser beams in a THz transmitter.

19. The method of claim 16 comprising determining a detected THz signal by mixing incoming THz radiation with two laser signals present at a THz receiver.

20. The method of claim 16 comprising recording the output of a THz receiver.

21. The method of claim 16 comprising creating a phase shift of $2\pi$.

22. The method of claim 16 comprising maintaining an infrared wavelength of a first laser beam fixed while the wavelength of a second laser is tuned to vary the THz wavelength.

23. The method of claim 16 wherein the step of generating THz radiation in the THz receiver is performed at the beating frequency of at least two lasers and further comprising coupling the laser beams into fibers.

24. The method of claim 16 comprising applying a voltage to a modulator.

* * * * *